April 17, 1956 — H. M. GEYER — 2,742,021
ACTUATOR FOR POWER STEERING APPARATUS
Filed Nov. 15, 1952
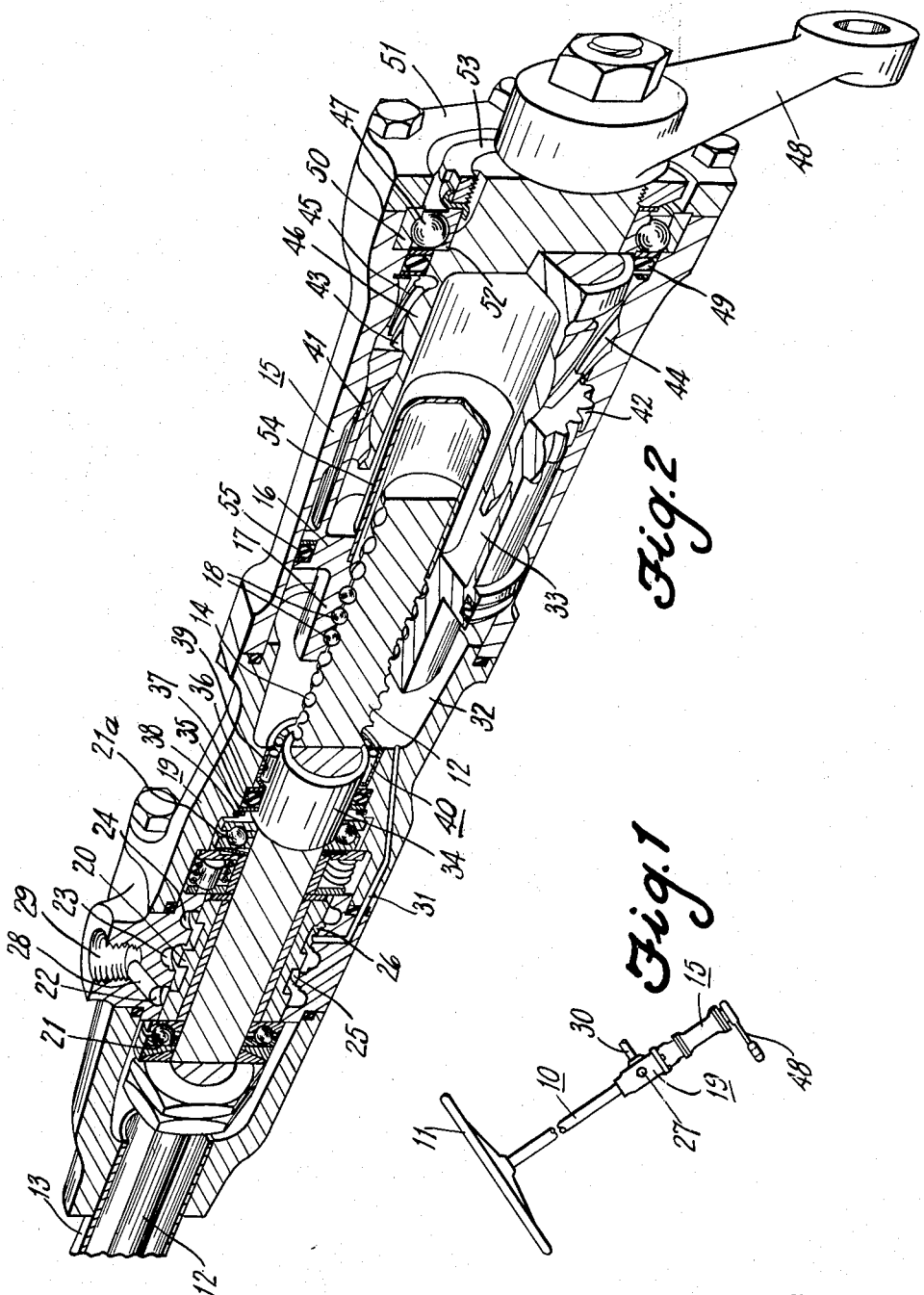
INVENTOR.
HOWARD M. GEYER
BY
ATTORNEYS United States Patent Office 2,742,021
Patented Apr. 17, 1956

2,742,021
ACTUATOR FOR POWER STEERING APPARATUS

Howard M. Geyer, Dayton, Ohio, assignor to General Motors Corporation, Detroit, Mich., a corporation of Delaware Application November 15, 1952, Serial No. 320,741

7 Claims. (Cl. 121—41)

The present invention pertains to power steering mechanism, and has particular applicability with regard to self-propelled vehicles.

Conventional power steering devices now in use are plagued with leakage of the fluid medium employed thereby. Moreover, in conventional apparatus, the angular relationship between the steering column and the actuator pitman arm render the installation difficult and the connections to the steering linkage unwieldy. To facilitate ease of assembly and disassembly of power steering apparatus to a vehicle, it is decidedly advantageous to position the actuator in alignment with the steering column. Accordingly, among my objects are the provision of power steering apparatus wherein the actuator and steering shaft are in alignment thereby producing a compact mechanism facilitating installation in a vehicle, and the further provision of mechanism of the aforesaid character wherein the number of fluid conduits susceptible of leakage is reduced to a minimum.

The aforementioned and other objects are accomplished in the present invention by constructing the apparatus in such a manner that the manually operable steering shaft and actuator are coaxially arranged. Specifically, the steering shaft having a threaded portion at one of its ends is operatively connected to a piston by means of a ball, screw and nut connection which reduces friction to a minimum. The piston is disposed for combined lineal and angular movement within an actuator cylinder arranged coaxially of the steering shaft. The piston has an axially extending skirt, the end portion of which has internal and external helical spline teeth formed thereon. The external spline teeth of the skirt engage internal helical spline teeth formed on the inner periphery of the cylinder, and the interal spline teeth on the skirt engage external helical spline teeth formed on a tubular member rotatably journaled within the cylinder and operatively connected to a pitman arm. The pitman arm is disposed at substantially 90° with respect to the axis of the steering shaft.

The actuator cylinder is rigidly attached to a fixed portion of the steering column, which, as disclosed, constitutes a valve casing. Disposed within the valve casing is a valve which is utilized to control the flow of pressure fluid to and from opposite sides of the actuator piston to assist in steering the vehicle in which the apparatus is installed. The valve mechanism, per se, forms no part of the present invention.

Combined lineal and angular motion of the actuator piston may be effected either manually or by fluid under pressure to cause the pitman arm to move. When movement of the piston is effected by pressure fluid, angular movement will be transmitted to the pitman arm through the inter-engaging helically splined portions of the actuator. In this instance combined lineal and angular movement of the piston will effect rotation of the steering shaft operatively connected thereto through the ball, screw and nut coupling. Conversely, if the steering shaft is manually rotated, the piston will likewise experience a combined lineal and angular movement by reason of the coupling therebetween, and the pitman arm will move angularly by reason of the inter-engaging helically splined portions of the actuator.

Further objects and advantages of the present invention will be apparent from the following description, reference being had to the accompanying drawing wherein a preferred embodiment of the present invention is clearly shown.

In the drawings:

Fig. 1 is a fragmentary side elevation of a steering column assembly constructed according to this invention.

Fig. 2 is a longitudinal view in perspective, partly in section and partly in elevation, of the lower portion of the steering column assembly shown in Fig. 1.

With particular reference to the drawing, a steering column assembly 10 is shown as having attached at one end thereof a manually rotatable steering wheel 11 which is operatively connected to a rotatable steering shaft 12 housed within a casing 13 of the steering column assembly. The lower end of the steering shaft 12 is spirally grooved at 14, the grooves being of substantially semi-circular configuration. The spirally grooved portion of the shaft 12 extends into an actuator cylinder 15. Disposed within the cylinder 15 is a piston 16 having an axially extending internally grooved portion 17 for cooperation with the spirally grooved portion 14 of the steering shaft 12. The coupling between the piston 16 and the shaft 12 is constituted by a plurality of balls 18 which ride in the complimentary semicircular grooves in the screw shaft and the portion 17 and constitute a substantially frictionless mechanical connection. The balls 18 circulate during relative movement between the screw shaft and the piston within a channel, not shown, formed within the portion 17 of the piston. Hereinafter this coupling will be referred to as the ball, screw and nut coupling wherein the shaft 12 constitutes the screw, and the portion 17 constitutes the nut.

The actuator cylinder 15 is rigidly connected, by any suitable means, to a valve casing 19, which is attached to a stationary portion of the steering column assembly. Disposed within the valve casing 19 and coaxially arranged with respect to the steering shaft 12 is a hollow spool valve element 20. The valve assembly is generally of the type disclosed in the Davis Patent 2,410,049, granted October 29, 1946, which is actuated by slight axial movements of the steering shaft. The valve is disclosed only by way of example and not by way of limitation in that any suitable valve structure may be incorporated in conjunction with the herein disclosed steering apparatus. The valve 20 may rotate relative to the shaft 12 by reason of end thrust bearings 21 and 21a being provided therebetween. The steering shaft 12 is permitted a slight longitudinal or axial motion, this motion serving to move the valve element 20 axially relative to the casing 19 for controlling flow of pressure fluid. The valve casing 19 has a plurality of annular ports 22, 23 and 24, while the valve element 20 has a pair of annular grooves 25 and 26 likewise constituting ports. The central casing port 23 is a supply port through which pressure fluid is introduced through conduit 27 in Fig. 1. The ports 22 and 24 on opposite sides of the supply port are drain ports, the port 22 being connected by a drillway 28 to an opening 29 in the casing 19 to which a conduit 30 may be attached, as in Fig. 1. The port 24 is likewise connected by a drillway, not shown, to the opening 29. Thus, it is apparent that the number of conduits connecting the power steering apparatus to a source of fluid, such as oil, under pressure, not shown, is reduced to a minimum thereby materially decreasing the possibility of malfunctioning due to leakage.

In the central position of the valve element 20, ports 25 and 26 slightly overlap both the pressure supply port 23 and the drain ports 22 and 24, whereby fluid flow is permitted from the supply conduit 27 through both drain ports 22 and 24 communicating with the drain conduit 30 when pressure fluid is not supplied to the actuator cylinder. As is shown in Fig. 2, the valve passage 26 connects with a passage 31, which leads to an upper chamber 32 of the actuator cylinder. Similarly, the valve passage 25 is connected by passages, not shown, within the valve casing 19 and the walls of cylinder 15 to a lower chamber 33 of the actuator. The operation of the valve in controlling the flow of pressure fluid to and from the actuator cylinder will not be dealt with in detail as the operation thereof will be apparent from a reference to the aforementioned Davis patent.

A portion of the shaft 12 between the valve element 20 and the threaded portion 14 has a collar 34 rigidly attached thereto. Adjacent one end of the collar 34 is a fluid seal assembly constituted by a pair of spaced annular members 35 and 36 and an intermediate O-ring 37. Annular member 37 abuts a snap ring 38 situated within a groove formed in the valve casing 19. Annular member 36 abuts a cage 39 of a roller bearing assembly 40 employed to journal the shaft 12 within the casing 19.

The piston 16 has an axially extending skirt 41, the end portion of which is formed with external helical spline teeth 42 and internal helical spline teeth 43. External helical spline teeth 42 engage helical spline teeth 44 formed on the inner periphery of the cylinder 15, while helical spline teeth 43 engage helical spline teeth 45 formed on the outer periphery of a tubular member 46 journaled for rotation within the cylinder 15 by means of ball bearing means 47. It is to be understood that the heretofore mentioned members are helically splined throughout their entire circumference. The member 46, in effect, constitutes one end wall of the cylinder 15 and is operatively connected by a splined device to a pitman arm 48, which extends at substantially 90° with respect to the axis of the shaft 12. Suitable fluid sealing means 49 are interposed between the sidewalls of the cylinder 15 and the portion of the member 46 constituting one of the end walls of the cylinder. The other end wall of the cylinder is formed by a portion of the valve casing 19 heretofore described. The outer race 50 of bearing means 47 is retained by an annular member 51 attached to the cylinder 15 by any suitable means, such as bolts, while the inner race 52 of the bearing means 47 is retained in position by means of a lock nut device 53, which threadedly engages a portion of the member 46.

The free end of pitman arm 48 may be connected to the steering draw bar, not shown, of a conventional steering linkage. Accordingly, the effect of turning the steering shaft 12 by the hand wheel 11 is to produce a steering effort which is power amplified by the pressure fluid directed against the piston. The piston 16, being centrally apertured, has attached thereto a cup-shaped member 54 into which the threaded end of the shaft 12 extends and retracts during movements of the piston 16. The piston 16 is provided with the usual sealing means 55 to insure fluid-tight engagement thereof with the inner periphery of the cylinder 15 and the cup-shaped member 54 is employed to prevent leakage of fluid medium between the chambers formed by the piston through the central recess thereof.

The operation of the actuator to effect angular movement of the pitman arm 48 under the impetus of pressure fluid is as follows: Upon a steering effort being exerted on the steering shaft 12 through the hand wheel 11, causing a slight axial movement of the shaft, the valve means within the casing 19 will be actuated whereupon pressure fluid will be admitted to one of the actuator chambers 32 or 33 with the other one being simultaneously connected to drain. In this instance the piston 16 will move lineally either to the left or to the right, as viewed in Fig. 2, dependent upon which actuator chamber is exposed to the pressure fluid. As the piston moves in either direction from the position it is shown in Fig. 2, the axial skirt 41 will likewise be moved, interengaging spline teeth 44 and 42 causing a twisting or angular movement to occur in the piston and skirt relative to the fixed cylinder 15. Relative movement between the skirt 41 also effects relative movement between spline teeth 43 and 45. Accordingly, the member 46 and the pitman arm 48 connected thereto experiences an angular movement which is the sum of that caused by spline teeth 44, 42, 43 and 45. Thus, the piston 16 experiences a combined lineal and angular movement within the cylinder 15, the lineal portion of the movement thereof effecting rotation of the steering shaft 12 through the ball screw and nut connection therebetween, while the combined lineal and angular movement of the piston effects angular movement of the pitman arm 48 through the interengaging spline teeth 44, 42, 43 and 45.

If, per chance, the fluid pressure system should fail, the pitman arm 48 may nevertheless be actuated manually in the following manner: Manual rotation of the steering shaft 12 by means of the hand wheel 11 will effect lineal movement of the piston 16 by reason of the ball, screw and nut connection therebetween. Lineal movement of the piston 16 by reason of rotation of steering shaft 12 will likewise effect angular movement of the piston 41 by reason of interengaging helical spline teeth 42 and 44. Combined lineal and angular movement of skirt 41 will likewise cause angular movement of the member 46 by reason of interengaging spline teeth 43 and 45 thereby the pitman arm 48 will experience an angular movement, which is the sum of that caused by spline teeth 44, 42, 43 and 45.

The unit can, and perhaps should, be designed so that the unit is readily reversible. This is desirable on passenger cars that normally are used on smooth roads. Hence, when car is turned, the caster and toe-in of the turning wheels will return the unit to the center position without steering effort to do so. However, on rough terrain vehicles, the spline angles can be made so that the unit will not be reversible and rolling roads will not pull the steering wheel out of the driver's hands.

It is readily apparent that the present invention provides a greatly simplified power steering unit, which may be easily installed in self-propelled vehicles. Moreover, by reducing the number of flexible conduit connections to a minimum, the possibility of malfunctioning due to leakage is minimized.

While the embodiment of the present invention as herein disclosed, constitutes a preferred form, it is to be understood that other forms might be adopted.

What is claimed is as follows:

1. An actuator including a manually movable input member, an angularly movable output member, a piston operably connected to the output member by means enabling axial movement of the piston relative to the output member, a connection between the input member and the piston whereby the rotary movement of the input member effects axial movement of the piston, a casing about the piston and having a connection therewith inducing simultaneous rotary movement of the piston when the same is caused to move axially and a valve for controlling fluid flow to and from the casing so as to create a pressure differential across the piston assisting the effort applied at the input member.

2. An actuator including a rotatable input member, an angularly movable output member, a piston operably connected to the output member by means enabling axial movement of the piston relative to the output member, a screw connection between the input member and the piston whereby the rotary movement of the input member causes axial movement of the piston, a fluid-tight casing confining the piston and having a connection therewith inducing simultaneous rotary movement of the piston when the same is caused to move axially, and a valve for controlling fluid flow to and from the casing so as to create a pressure differential across the piston assisting the effort applied at the input member.

3. An actuator comprising a rotatable input member, an angularly movable output member adapted for connection to a steering linkage, a piston operably connected to said output member, said last connection enabling axial movement of said piston relative to said output member, screw means associated with said input member and operatively accommodated within said piston so that rotary movement of said input member results in axial movement of said piston, a casing confining said piston and having a helical connection therewith inducing simultaneous rotary movement of said piston, and a valve directly actuated by said input member to control fluid flow to and from said casing so as to create a pressure differential across said piston assisting the effort applied at said input member.

4. An actuator comprising a manually rotatable input member, an angularly movable output member, a piston connected to said output member through an element having splines complementary to splines carried by said piston and said output member, screw means associated with said input member and operatively accommodated within said piston so that rotary movement of said input member results in axial movement of said piston, a casing confining said piston and having a helical connection therewith inducing simultaneous rotary movement of said piston, and a valve actuated by said input member to control fluid flow to and from said casing so as to create a pressure differential across said piston assisting the effort applied at said input member.

5. An actuator comprising a manually rotatable input member, an angularly movable output member adapted for connection to a steering linkage, a piston connected to said output member through an element having splines complementary to splines carried by said piston and said output member, a helical ball connection between said input member and said piston whereby rotary movement of said input member results in axial movement of said piston, a casing confining said piston and having a helical spline connection therewith inducing simultaneous rotary movement of said piston, and a valve actuated by reactionary axial movement of said input member to control fluid flow to and from said casing so as to create a pressure differential across said piston assisting the effort applied at said input member.

6. An actuator including a rotatable input member, an angularly movable output member, a piston co-axial with the input member and operably connected to the output member by means enabling axial movement of the piston relative to the output member, a screw connection between the input member and the piston whereby the rotary movement of the input member causes axial movement of the piston, a casing confining the piston and having a connection therewith inducing simultaneous rotary movement of the piston when the same is caused to move axially, and a valve for controlling fluid flow to and from the casing so as to create a pressure differential across the piston assisting the effort applied at the input member, said valve being co-axial with said input member and said piston and being actuated through said input member.

7. An actuator comprising a manually rotatable input shaft, an angularly movable output member in the form of an arm having its axis disposed substantially normal to the axis of said shaft, said output member being adapted for connection to a steering linkage, a piston co-axial with said shaft and operably connected to said output member through an element having splines complementary to splines carried by said piston and said output member, a helical ball connection between said shaft and said piston whereby rotary movement of said shaft results in axial movement of said piston, a casing confining said piston and having a helical spline connection therewith inducing simultaneous rotary movement of said piston, and a valve surrounding and co-axial with said shaft, said valve being actuated by reactionary axial movement of said shaft to control fluid flow to and from said casing so as to create a pressure differential across said piston assisting the effort applied at said input member.

References Cited in the file of this patent

UNITED STATES PATENTS

| 243,450 | Lafargue | June 28, 1881 |
| 1,476,703 | Forman | Dec. 11, 1923 |
| 1,760,733 | Barnhart | May 27, 1930 |
| 1,946,309 | Coffman | Feb. 6, 1934 |
| 2,035,161 | Herzmark | Mar. 24, 1936 |
| 2,186,229 | Baer et al. | Jan. 9, 1940 |
| 2,192,175 | Ballard | Mar. 5, 1940 |
| 2,410,049 | Davis | Oct. 29, 1946 |
| 2,605,854 | MacDuff | Aug. 5, 1952 |

FOREIGN PATENTS

| 444,546 | Germany | May 21, 1927 |
| 535,479 | Great Britain | Apr. 10, 1941 |